United States Patent

[11] 3,588,185

[72] Inventor John G. Cannon
 Allegheny, Pa.
[21] Appl. No. 834,835
[22] Filed June 19, 1969
[45] Patented June 28, 1971
[73] Assignee Westinghouse Air Brake Company
 Wilmerding, Pa.

[54] LOCOMOTIVE BRAKE CONTROL APPARATUS SUITED FOR REMOTE MULTIPLE UNIT OPERATION
 13 Claims, 3 Drawing Figs.
[52] U.S. Cl. ..................................... 303/20,
 105/61
[51] Int. Cl. ........................................ B60t 13/68
[50] Field of Search........................................... 105/61;
 303/3, 20

[56] References Cited
 UNITED STATES PATENTS
 3,374,035 3/1968 Howard........................ 303/20
 3,384,032 5/1968 Ruff............................. 105/61

Primary Examiner—Duane A. Reger
Attorneys—Adelbert A. Steinmiller and Ralph W. McIntire, Jr.

ABSTRACT: Brake control apparatus for the lead locomotive of a multiple unit locomotive control system wherein the brake valve on the lead locomotive is manually operable conventionally to control application and release of the brakes on the forward portion of the train from the lead locomotive and also to effect corresponding control (via radio-transmitted signals initiated by manual operation of the brake valve on the lead locomotive) of the brakes on the remaining portion of the train from the brake valve on a slave locomotive remotely located in the train. Differential-pressure-operated master controller switch devices, selectively operated in correspondence to the manual operation of either the automatic or the independent brake valve on the lead locomotive, establish suitable control circuitry for radio transmission of appropriate brake control signals from the lead to the slave locomotive so as to cause a variation of the pressure in the equalizing reservoir pressure on the slave locomotive, or a variation of the pressure in the brake cylinders on the slave locomotive, in correspondence with the variation effected on the lead locomotive by the respective brake valve thereon, thereby initiating an application or a release of the brakes on that portion of the train coupled to the slave locomotive concurrently with that initiated on that portion of the train coupled to the lead locomotive, or to cause independent application and release of the brakes on the slave locomotive substantially simultaneously with that on the lead locomotive.

INVENTOR.
JOHN G. CANNON
BY
A.G. Steinmiller
ATTORNEY

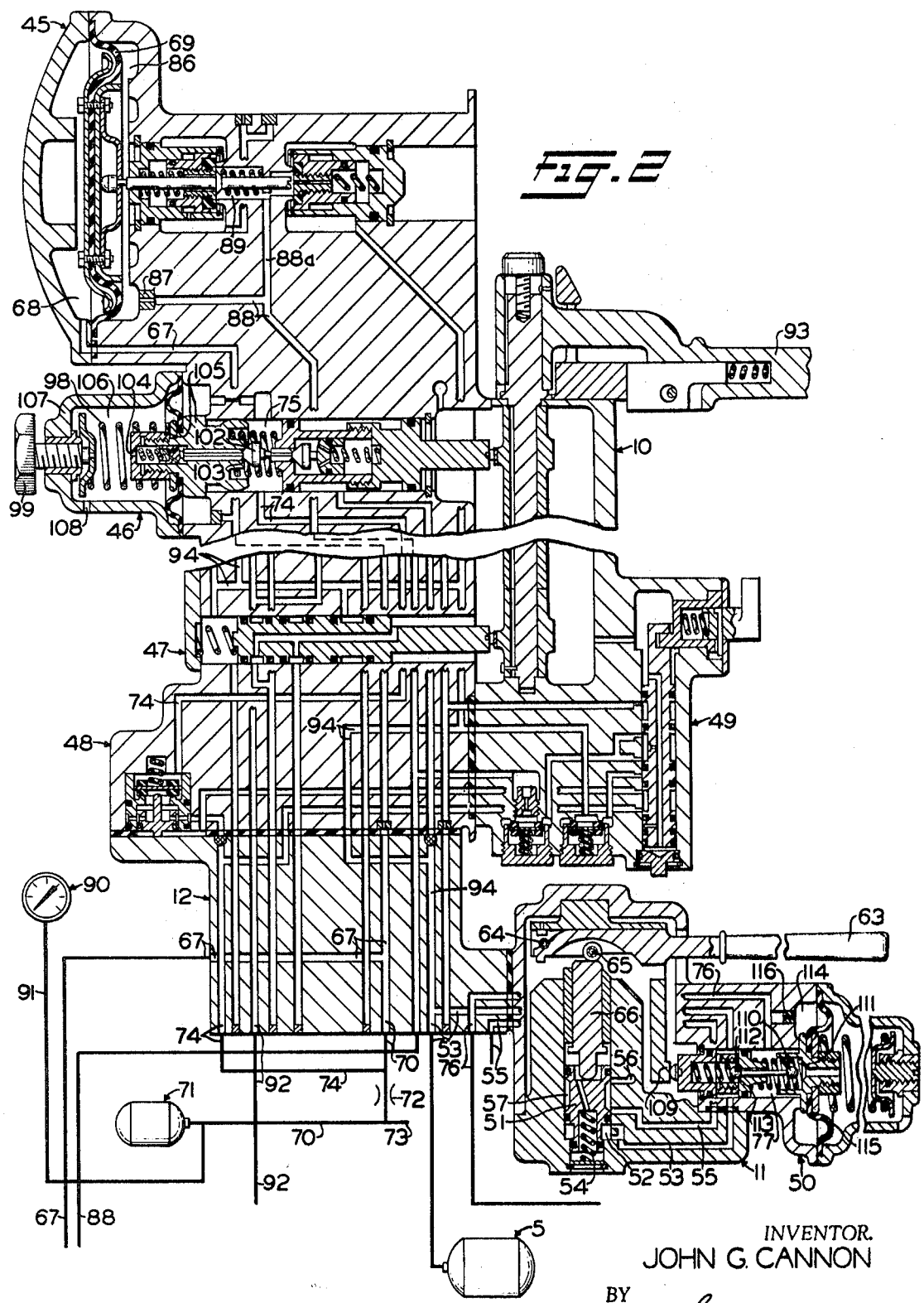

LOCOMOTIVE BRAKE CONTROL APPARATUS SUITED FOR REMOTE MULTIPLE UNIT OPERATION

BACKGROUND OF THE INVENTION

There are presently in use on some American railroads so-called RMU (remote multiple unit) brake control systems capable of effecting, via radio-communicated signals, simultaneous operation of brake controls on a slave locomotive located intermediate the length of a train by operation of brake controls on the lead locomotive. In one such brake control system, the lead locomotive is provided, in addition to the usual engineer's brake valve, with a manually operated pushbutton-type brake control console the manual operation of which simultaneously effects electropneumatic control of pressure in an equalizing reservoir and the brake pipe on the lead locomotive and also, via radio-communicated signals, control of pressure in an equalizing reservoir and the brake pipe on the slave locomotive, whereby operation of the brake equipment on those cars located between the slave locomotive and the end of the train occurs substantially simultaneously with operation of the brake equipment on those cars located intermediate the lead and the slave locomotive. The additional control equipment to insure that a locomotive is adapted for use as the lead locomotive in RMU operation represents not only additional equipment costs but additional difficulties in servicing and maintaining the equipment.

Accordingly, it is the purpose of this invention to provide a locomotive control equipment suitable for use on the lead locomotive in RMU operation without the additional separate control equipment including a manually operated pushbutton-type brake control console.

SUMMARY OF THE INVENTION

According to the present invention, a locomotive brake control equipment suited for RMU operation is provided, in which the conventional automatic and independent brake valves are employed for RMU operation, that is for control of the brakes on the lead locomotive and on the slave locomotive in the same train, without the addition of a separate pushbutton-type brake control console. This is made possible by the provision of two differential-pressure-operated master controller switch devices the operation of which is controlled by the respective selective manual operation of the handle of either the automatic or the independent brake valve to its various brake control positions, in which the respective brake valve functions in its normal manner to control the pressure in either the equalizing reservoir or in the brake cylinder on the lead locomotive for brake control purposes and at the same time, via radio-communicated signals initiated by operation thereof, effect similar variation of the pressure in either the equalizing reservoir or the brake cylinder on the slave locomotive for respectively effecting corresponding simultaneous brake control on that portion of the train coupled to the slave locomotive or control of the brakes on the slave locomotive or locomotives only.

In the accompanying drawings:

FIG. 2 is an enlarged diagrammatic view of the automatic and independent brake valves shown in FIG. 1.

Figure 1:
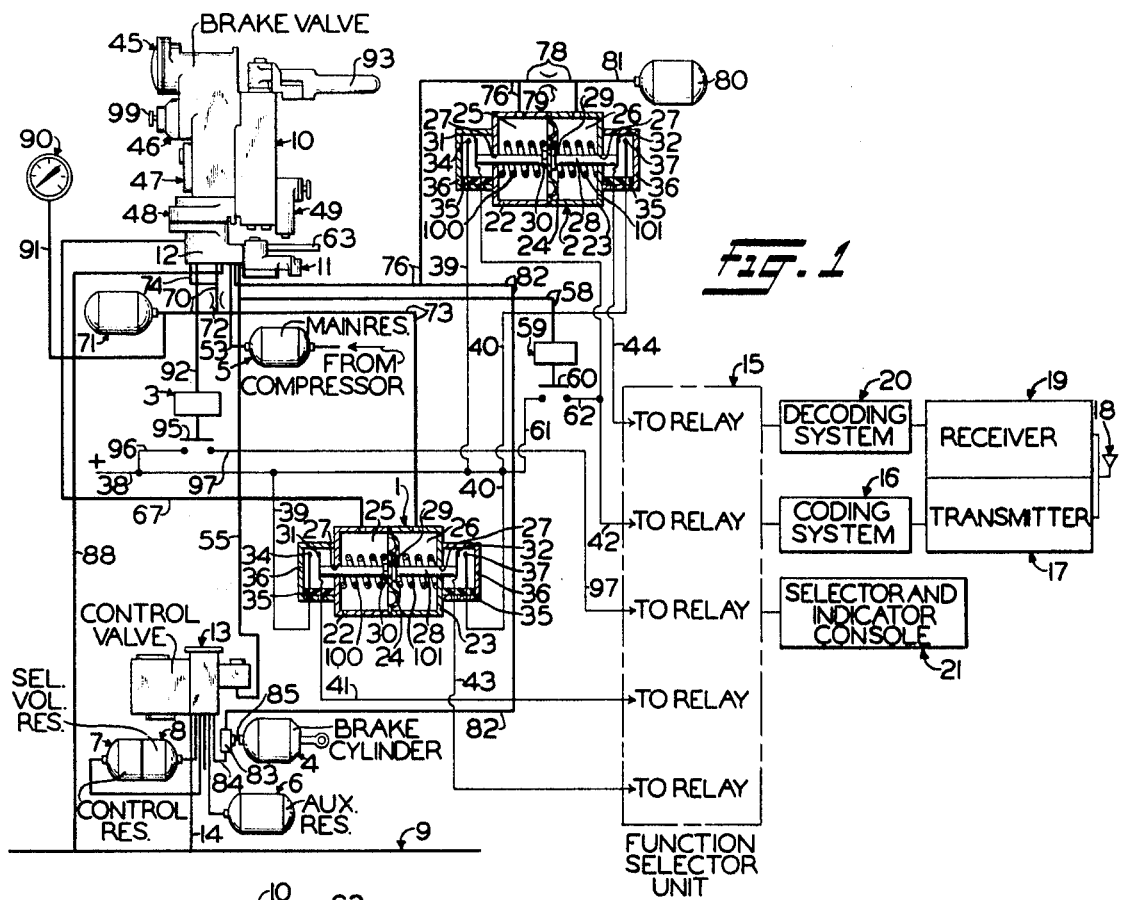
FIG. 1 is a diagrammatic view of a locomotive brake control equipment constructed in accordance with one embodiment of the invention when this locomotive is used as the lead locomotive in RMU operation.

As shown in FIG. 1 of the drawings, the conventional control equipment heretofore provided on a locomotive when it is used as the lead locomotive in remote multiple unit operation is modified by the inclusion of two differential-pressure-operated master controller switch devices 1 and 2 and a fluid-pressure-operated switch 3, and the elimination of the heretofore known and used manually operable brake control console which embodied a plurality of pushbutton-type of switches that were manually operated to effect brake applications and brake releases on the plurality of locomotives and cars comprising the train, it being understood that operation of the brake equipment on the slave locomotive and those cars comprising the portion of the train coupled to the slave locomotive is effected via radio-transmitted signals.

The brake control equipment constituting the present invention further comprises, for pneumatically controlling the brakes on the lead locomotive, a brake cylinder 4, a main reservoir 5, an auxiliary reservoir 6, a control reservoir 7 which is combined with a selector volume reservoir 8 into a two-compartment reservoir, a brake pipe 9 that extends from end to end of the locomotive and at one end is coupled to the train brake pipe by the usual hose and hose couplings, an engineer's automatic brake valve 10 operative to control the pressure in the brake pipe 9, an independent brake valve 11 that is secured to a pipe bracket 12 of the automatic brake valve 9 by any suitable means (not shown) for controlling the brakes on the locomotives independently of the brakes on the cars in the train and a fluid pressure brake control valve 13 that is connected by a branch pipe 14 to the brake pipe 9.

In order to effect operation of the brake equipment on the slave locomotive via radio signals transmitted thereto from the lead locomotive, the brake control equipment embodying the present invention further includes a function selector unit 15 having a plurality of electrical relays.

The pickup circuits of two of these relays are controlled by the differential-pressure-operated master controller switch device 1, and the pickup circuits of two other of these relays are controlled by the differential-pressure-operated master controller switch device 2. The pickup circuit of a fifth one of these relays is closed in response to the supply of fluid under pressure to the fluid-pressure-operated switch 3 in a manner hereinafter explained.

For transmitting radio signals to the slave locomotive, the present invention also includes a coding system 16 for receiving the output information of the function selector unit 15 and preparing this information for transmittal to the slave locomotive via a radio transmitter 17 having an antenna 18. This brake equipment on the lead locomotive further comprises a radio receiver 19 for receiving via antenna 18 information in the form of radio signals transmitted from the slave locomotive regarding the status of this locomotive and converting these radio signals to electrical inputs which are fed to a decoding system 20 that in turn transmits the information regarding the slave locomotive to the function selector unit 15 which coordinates this information and furnishes it to a selector and indicator console 21 for display.

Since the differential-pressure-operated master controller switch devices 1 and 2 are identical in construction, a description of one will suffice for both, it being understood that corresponding parts are denoted by the same reference numeral.

As shown in detail in FIG. 1, the differential-pressure-operated master controller switch device 1 comprises a sectionalized casing constituting a pair of cuplike casing sections 22 and 23 between which is clamped the outer periphery of a diaphragm 24 by any suitable means (now shown).

The diaphragm 24 cooperates with the casing sections 22 and 23 to form within the switch device 1 and on the respective opposite sides of the diaphragm 24 a pair of chambers 25 and 26.

The end of each of the cuplike casing sections 22 and 23 is provided with a central bore 27 which at one end opens into the respective chambers 25 and 26. Slidably mounted in the bores 27 is a stem 28 that extends through the central opening provided in the diaphragm 24. That portion of the stem 28 disposed within the chamber 26 is provided with a collar 29 that on its left-hand side forms a shoulder against which rests the inner periphery of the diaphragm 24 which is clamped against this collar by a nut 30 that has screw-threaded engagement with screw threads formed on a portion of the stem 28 that is adjacent the left-hand side of this collar 29.

Secured by any suitable means to the respective opposite ends of the stem 28 are a pair of movable contacts 31 and 32. Upon movement of the stem 38 in the direction of the left hand, the movable contact 31 is moved into circuit-closing contact with a stationary contact 34 that is carried by a plate 35 that is constructed of any suitable insulating material which, for example, may be rubber. The plate 35 is bonded or otherwise secured to a switchbox 36 in which the contacts 31 and 34 are disposed and which is anchored to the casing section 22 by any suitable means (not shown).

Likewise, upon movement of the stem 28 in the direction of the right hand, the movable contact 32 is moved into circuit-closing contact with a second stationary contact 37 that is carried by a second insulating plate 35 identical to the first and secured in like manner to a second switchbox 36 in which the contacts 32 and 37 are disposed and which is anchored to the casing section 23 by any suitable means (now shown).

In each of the switch devices 1 and 2 the stationary contacts 34 are connected to a positive power supply wire 38 by a wire 39 that extends through the corresponding insulation plate 35 and an opening provided in the side of the switchbox 36 to which the respective plate is secured. Likewise, the stationary contacts 37 are connected to the power supply wire 38 by a wire 40 which in like manner extends through the corresponding insulation plate 35 and switchbox 36.

The movable contact 31 of the switch device 1 is connected by a wire 41 having a loop therein to an automatic brake application relay (not shown) in the function selector unit 15 to cause energization or pickup of this relay. Whenever this relay is thus picked up, transmission of the automatic brake application command signal to the slave locomotive is made via radio-transmitted signals effected by operation of the coding system 16, transmitter 17 and antenna 18.

The movable contact 31 of the switch device 2 is connected by a wire 42 having a loop therein to an independent quick-release relay (not shown) in the function selector unit 15 to cause energization or pickup of this relay. Whenever this relay is thus picked up, transmission of the independent brake release command signal to the slave locomotive is made via radio-transmitted signals effected by operation of the coding system 16, transmitter 17 and antenna 18.

The movable contact 32 of the switch device 1 is connected by a wire 43 having a loop therein to an automatic brake release relay (not shown) in the function selector unit 15 to cause energization or pickup of this relay. Whenever this relay is thus picked up, transmission of the automatic brake release command signal to the slave locomotive is made via radio-transmitted signals effected by the coding system 16, transmitter 17 and antenna 18. When this automatic brake release command signal is received on the slave locomotive it effects energization of a solenoid coil of a brake-valve-charging cutout spool valve which is thereupon moved to a position to release fluid under pressure from a pressure chamber of a brake pipe cutoff valve of the automatic brake valve 10 on the slave locomotive. Upon this release of fluid under pressure from the brake pipe cutoff valve on the slave locomotive, the automatic brake valve 10 on this locomotive is rendered effective to supply fluid under pressure to the train brake pipe. Assuming that the brake valve 10 on the lead locomotive is in its release position, the supply of fluid under pressure to the train brake pipe is now simultaneously effected by the operation of the automatic brake valve 10 on both the locomotives in the train, in a manner hereinafter more fully described, until the train brake pipe is charged to the normal pressure carried therein which may be, for example, 70 pounds per square inch.

The movable contact 32 of the switch device 2 is connected by a wire 44 having a loop therein to an independent brake application relay (not shown) in the function selector unit 15 to cause energization or pickup of this relay. Whenever this relay is thus picked up, transmission of the independent brake application command signal to the slave locomotive is made via radio-transmitted signals effected by the coding system 16, transmitter 17 and antenna 18.

The automatic brake valve 10 and the independent brake valve 11 are both secured to the pipe bracket 12 and thus constitute a 26–C type of self-lapping brake valve manufactured by the Westinghouse Air Brake Division of Westinghouse Air Brake Company, a subsidiary of American Standard, Inc.

The automatic brake valve 10, as shown in FIG. 2 of the drawings, comprises a relay valve 45, a self-lapping regulating or control valve 46, a suppression valve 47, an equalizing reservoir cutoff valve 48, a manually positionable selector valve 49 for selectively conditioning the brake valve 10 for effecting either direct release operation of the brake control valve on each car in a train of cars hauled by a locomotive provided with this automatic brake valve 10, if each car is provided with a direct release-type brake control valve, or graduated application and graduated release operation of the brake control valve on each car, if each car is provided with a graduated release-type control valve, for cutting out control of brake pipe pressure by the brake valve 10 for multiple unit or trailing (pusher) unit operation, or for conducting a brake pipe leakage test, a vent valve, an emergency valve, and a brake pipe cutoff valve, the latter three not being shown in FIG. 2 since they form no part of the present invention.

The independent brake valve 11 comprises a self-lapping valve unit 50 which may be of any standard construction and therefore, will not be described in detail herein. The independent brake valve 11 further comprises a differential area piston-type independent release valve 51, reciprocal in a direction at right angles to the axis of the self-lapping valve unit 50. This release valve 51 has small and larger diameter ends which are exposed to atmospheric pressure and has therebetween an annular chamber 52 which is constantly open to the main reservoir 5 via a passageway and corresponding pipe 53. A bias spring 54 acting on the small end of the release valve 51 and assisted by main reservoir pressure in the annular chamber 52 urges the release valve 51 to a normal position in which it is shown in FIG. 2. In this position, an actuating passageway 55 is connected to an atmospheric vent port 56 via a peripheral annular groove 57 formed on the release valve 51. This actuating passageway 55 is connected by a correspondingly numbered pipe to the release selector valve portion of the quick-release valve which constitutes a part of the hereinbefore-mentioned brake control valve 13 (FIG. 1) comprising a part of the brake control equipment on the lead locomotive to provide for effecting an independent release of an automatic brake application on this locomotive.

In order to provide for substantially simultaneously effecting transmission of the independent brake release command signal to the slave locomotive to effect a release of the brakes only on this locomotive subsequent to the engineer effecting a brake application on all the locomotives and cars in the train by use of the automatic brake valve 10, one end of a pipe 58 is connected to the pipe 55 intermediate the ends thereof and the opposite end is connected to a fluid-pressure-operated switch 59. In the closed position of normally open contact 60 of switch 59, a circuit is established between a wire 61 that is connected to the hereinbefore-mentioned power supply wire 38 and a wire 62 that is connected to the wire 42 intermediate the ends thereof. As hereinbefore stated, the wire 42 is connected to the independent quick-release relay in the function selector unit 15. Therefore, closing of contact 60 causes energization or pickup of this relay, which, when picked up effects transmission of the independent brake release command signal to the slave locomotive.

A brake valve handle 63 is hinged on a pin 64 and also carries a roller 65, which, upon manual depression of the handle 63 to rock it about the pin 64, acts through a pusher 66 to shift the release valve 51 to an independent brake release position against the pressure of the spring 54 and the fluid under pressure from the main reservoir acting in the annular chamber 52. In this depressed position, the peripheral annular groove 57 connects the main reservoir passageway 53 to the actuating passageway and pipe 55 for charging the latter to effect an independent release of an automatic brake application on the locomotives in the train in a manner hereinafter described in detail.

As shown in the drawings, opening into the chamber 25 in the switch device 1 is one end of a pipe 67, the opposite end of which is connected to a corresponding passageway in the pipe brake 12 which passageway extends through the pipe bracket 12 and sectionalized casing of the brake valve 10 and opens into a chamber 68 (FIG. 2) at the left-hand side of a diaphragm 69 of the hereinbefore-mentioned relay valve 45. Opening into that portion of the passageway 67 in the pipe bracket 12 is a passageway 70 that is connected by a corresponding pipe to an equalizing reservoir 71 (FIGS. 1 and 2) via a choke 72 disposed in this pipe. Connected to the pipe 70 between the equalizing reservoir 71 and the choke 72 is one end of a pipe 73 the opposite end of which opens into the chamber 26 in the switch device 1. Connected to the pipe 70 between the choke 72 and the pipe bracket 12 is one end of a pipe 74 that at its opposite end is connected to a corresponding passageway in the pipe bracket 12. This passageway extends through the hereinbefore-mentioned equalizing reservoir cutoff valve 48, while it is in its open position, and opens into a delivery chamber 75 (FIG. 1) in the control valve 46 of automatic brake valve 10.

From the foregoing, it is apparent that fluid under pressure flows from the delivery chamber 75 of the control valve 46 to the chamber 25 (FIG. 1) in the switch device 1 at an unrestricted rate via passageway and pipe 74, pipe and passageway 70 and passageway and pipe 67. Fluid under pressure also flows at an unrestricted rate from the passageway 67 to the chamber 68 in the relay valve 45.

Furthermore, it is apparent that fluid under pressure flows from the delivery chamber 75 to the chamber 26 in the switch device 1 at a restricted rate determined by the size of the choke 72 via passageway and pipe 74, pipe 70, choke 72 and pipe 73. Fluid under pressure also flows at a restricted rate from the choke 72 to the equalizing reservoir 71 via the pipe 70.

Opening into the chamber 25 in the switch device 2 is one end of a pipe 76 that at its opposite end is connected to a corresponding passageway in the independent brake valve 11 which passageway opens into a delivery chamber 77 (FIG. 2) in the self-lapping valve unit 50 of the independent brake valve 11. Connected to the pipe 76 (FIG. 1) intermediate the ends thereof is one end of a pipe 78 having a choke 79 therein. The opposite end of the pipe 78 opens into the chamber 26 in the switch device 2. A volume reservoir 80 is connected to the pipe 78 on the downstream or right-hand side of the choke 79 by a pipe 81 the purpose of this volume reservoir 80 being to provide stability for the switch device 2.

In order to provide for an independent brake application and a subsequent independent release of the brakes on the lead locomotive by manual operation of the independent brake valve 11, one end of a pipe 82 is connected to the pipe 76 intermediate the ends thereof and the opposite end is connected to one inlet of a double check valve 83. The other inlet of this double check valve 83 is connected by a pipe 84 to the brake cylinder port of the hereinbefore-mentioned brake control valve 13, and the outlet of this double check valve 83 is connected by a short pipe 85 to the brake cylinder 4.

As shown in FIG. 2 of the drawings, a chamber 86 in the relay valve 45 and at the right-hand side of the diaphragm 69 is connected to the hereinbefore-mentioned brake pipe 9, (FIG. 1) via a choke 87 and a passageway and corresponding pipe 88. A branch 88a (FIG. 2) of the passageway 88 opens into the delivery chamber 89 of the relay valve 45. Consequently, the right-hand side of the diaphragm 69 is subject to brake pipe pressure in the chamber 86 and the left-hand side of this diaphragm is subject to equalizing reservoir pressure in the chamber 68. Accordingly, the relay valve 45 is operative in response to variations of pressure effected in the equalizing reservoir 71 by operation of the control valve 46 to effect a corresponding variation of pressure in the brake pipe 9.

In order that the engineer may always be able to quickly determine the true pressure in the equalizing reservoir 71, the usual equalizing reservoir pressure gauge 90 is connected by a pipe 91 to the pipe 70 between the equalizing reservoir 71 and the choke 72.

As shown in the drawings, one end of a pipe 92 is connected to the hereinbefore-mentioned fluid-pressure-operated switch 3 and the opposite end of this pipe is connected to a corresponding passageway in the automatic brake valve 10 which passageway leads to an emergency valve (not shown) in this brake valve 10. It will be understood that while a handle 93 of the automatic brake valve 10 occupies all of its positions except its emergency position the emergency valve occupies a corresponding position in which it establishes a communication between the pipe and corresponding passageway 92 and atmosphere so that fluid under pressure is completely vented from the fluid-pressure-operated switch 3. It will be further understood that, upon manual movement of the handle 93 of the automatic brake valve 10 to its emergency position, the emergency valve in this brake valve 10 is moved to a corresponding emergency position in which it establishes a communication through which fluid under pressure may flow from the main reservoir 5 to the switch 3 via pipe and passageway 53, a passageway 94 (FIG. 2), a peripheral annular groove (not shown) on the emergency valve, and the passageway and corresponding pipe 92 to effect operation of switch 3 to its closed position. In the closed position of normally open contact 95 of switch 3 a circuit is established between a wire 96 that is connected to the hereinbefore-mentioned power supply wire 38 and a wire 97 that is connected to an emergency relay (not shown) in the function selector unit 15 to cause energization or pickup of this relay. Whenever this relay is picked up, transmission of the emergency brake application command signal to the slave locomotive is made via radio-transmitted signals effected by the coding system 16, transmitter 17 and antenna 18.

The brake control valve 13 may be of any suitable type, such as, for example, a 26–F type of brake control valve manufactured by the aforesaid Westinghouse Air Brake Division of Westinghouse Air Brake Company.

The function selector unit 15 may be, such as, for example, an A–3–A type of selector unit manufactured by the aforesaid company.

The coding system 16, the transmitter 17, the receiver 19 and the decoding system 20 are all embodied in a single coding cabinet and constitute the No. 580 solid-state code system manufactured by the Signal & Communications Division of Westinghouse Air Brake Company.

The antenna 18 may be, such as, for example, a 6 AN–1 antenna manufactured by Antenna Specialists Company. This antenna 18 is connected to the transmitter 17 and receiver 19 by a suitable cable.

The selector and indicator console 21 may be such as, for example, an A–2 type of selector and indicator console manufactured by the aforesaid Westinghouse Air Brake Division of Westinghouse Air Brake Company.

The main reservoir 5 is charged with fluid under pressure by the usual fluid compressor (not shown) carried on the locomotive.

OPERATION

Let it be supposed that a locomotive is provided with the brake control apparatus shown in the drawings and that this locomotive is the lead locomotive in an RMU train consist. Let it be further supposed that a locomotive is coupled between two cars in the train which may be at a distance from the lead locomotive, and that the brake control equipment on this slave locomotive includes, with the exception of the differential-pressure-operated master controller switch devices 1 and 2, the same brake control equipment as shown in the drawings with the addition of a brake control center, which may be, such as, for example, an A-410 brake control center manufactured by the aforesaid Westinghouse Air Brake Division. It will be understood that this brake control equipment on the slave locomotive is operative in response to the radio-transmitted signals received from the lead locomotive to control the pressure in the equalizing reservoir on this slave locomotive and correspondingly the pressure in that portion of the train brake pipe extending in both directions from the slave locomotive.

After a train is made up, the lead and slave locomotive control equipments must be conditioned as follows:

1. The controls on the lead locomotive set for lead operation.
2. The selector valve 49 of the brake valve 10 on both the lead and the slave locomotive set in freight position.
3. The power supply switch of the selector and indicator console 21 shown in the drawings is set in power ON position, it being understood that a fluid pressure brake switch on this console 21 is set in an IN position, subsequent to the setting this power supply switch in its power ON position.
4. The controls on the slave locomotive set for trailing operation, except for the fluid pressure brakes which must be set for lead operation.
5. The handle 93 of the automatic brake valve 10 and the handle 63 of the independent brake valve 11 on the slave locomotive must be moved to their brake release position.
6. The function selector unit on the remote locomotive set in power ON position.

In order to initially effect charging of the brake pipe 9 on the lead locomotive and the train brake pipe that extends back through each car in the train and the brake equipment on each of these cars, the engineer on the lead locomotive will manually move the handle 93 of the brake valve 10 on this locomotive to its brake release positions.

Also, it may be assumed that a regulating spring 98 (FIG. 2) of the self-lapping control valve 46 of the brake valve 10 on both the lead and the remote locomotive has been manually adjusted by means of an adjusting screw 99 so that this control valve 46 will provide in its delivery chamber 75 a desired normal pressure, which, for example, may be 70 pounds per square inch.

It will be understood that while the selector valve 49 of the brake valve 10 on each locomotive occupies its freight position, the supply of fluid under pressure from the main reservoir 5 on the respective locomotive to the corresponding equalizing reservoir cutoff valve 48 will be effected only while the handle 93 occupies its brake release position to cause opening of this valve. Consequently, fluid under pressure will flow from the delivery chamber 75 of the control valve 46 of the brake valve 10 on the lead locomotive to the corresponding equalizing reservoir 71 via passageway and corresponding pipe 74, pipe 70 and choke 72. Fluid under pressure thus supplied to the pipe 70 also flows to the chamber 68 in the relay valve 45, via passageways 70 and 67 whereupon this relay valve is operated to effect the supply of fluid under pressure from the main reservoir 5 on the lead locomotive to that portion of the train brake pipe connected to this locomotive.

Some of the fluid under pressure flowing to the passageway 67 from the passageway and pipe 70 flows to the chamber 25 (FIG. 1) in the switch device 1 via the pipe 67. Fluid under pressure thus supplied to this chamber 25 is effective on the left-hand side of the corresponding diaphragm 24 to deflect it in the direction of the right hand and thereby move the stem 28 in this same direction until the movable contact 32 carried on the right-hand end of this stem is moved into circuit-closing contact with the corresponding stationary contact 37 it being noted that the loop in the wire 43 provides for this movement without breaking the wire 43. In this circuit-closed position of these contacts 32 and 37 a circuit is established between the wire 40 that is connected to the power supply wire 38 and the wire 43 that is connected, as aforesaid, to the automatic brake release relay in the function selector unit 15 to cause energization or pickup of this relay. As hereinbefore explained, when this automatic brake release relay is picked up, automatic brake release command signals are transmitted from the lead locomotive to the slave locomotive to cause the automatic brake valve 10 on this locomotive to effect the supply of fluid under pressure to that portion of the train brake pipe connected thereto. Consequently, the supply of fluid under pressure to the train brake pipe is now simultaneously effected by operation of the automatic brake valve 10 on both the locomotives in the train until the train brake pipe is charged to the normal pressure carried therein.

It will be noted from FIG. 1 of the drawings that fluid under pressure supplied to the equalizing reservoir 71 via the choke 72 also flows to the chamber 26 in the switch device 1 via the pipe 73 at a rate determined by the size of the choke 72 so that the chamber 26 is charged with fluid under pressure at a slower rate than the chamber 25. Consequently, it is apparent that the contacts 32 and 37 of the switch device 1 remain in their closed position until the pressure in the chamber 26 is increased to substantially that in the chamber 25 which corresponds to the setting of the control valve 46. Upon substantial equalization of pressure in the chambers 25 and 26, a pair of springs 100 and 101, disposed on opposite sides of the diaphragm 24 and in surrounding relation to the stem 28, is rendered effective to move the diaphragm 24 and stem 28 to the position shown in FIG. 1 in which the movable contact 32 is moved out of circuit-closing contact with the stationary contact 37 thus opening the circuit to the automatic brake release relay in the function selector unit 15 to cause deenergization of this relay.

Since the brake control valve 13 is connected to the brake pipe 9 by the branch pipe 14, fluid under pressure will flow from the brake pipe 9 to the brake control valve 13 to effect operation thereof to its release position in which it causes fluid under pressure to be completely released from the brake cylinder 4 thereby releasing the brakes on the lead locomotive, and in which it causes the auxiliary reservoir 6, control reservoir 7 and selector volume reservoir 8 to be charged to the pressure carried in the brake pipe 9. Likewise, the brake control valves on the slave locomotive and all the cars in the train will operate in response to charging of the train brake pipe to the normal pressure carried therein, as determined by the setting of the control valve 46 of the automatic brake valve 10 on the two locomotives in the train, which normal pressure may be, for example, as hereinbefore stated, 70 pounds per square inch, to effect a complete release of the brakes on the two locomotives and all the cars in the train.

The engineer on the lead locomotive may now start the train on its journey to the next terminal or station.

Let it be supposed that after the train has traveled some distance from its starting point, it must descend a grade that requires that the engineer on the lead locomotive effect a brake application on the entire train. Accordingly, the engineer will move the handle 93 of the automatic brake valve 10 on the lead locomotive out of its release position and to a position in its application zone corresponding to the degree of reduction of pressure desired in the train brake pipe. Therefore, the self-lapping control valve 46 of the automatic brake valve 10 will now be operated in the usual manner in which an exhaust valve 102 (FIG. 2), that is disposed in the chamber 75, is unseated from its valve seat 103. When valve 102 is thus unseated, fluid under pressure flows from the chamber 25 (FIG. 1) in the switch device 1 and the chamber 68 in the relay valve 45 to atmosphere at an unrestricted rate via pipe and passageway 67, passageway and pipe 70, pipe and passageway 74, chamber 75, past now unseated exhaust valve 102, a port 104 in an exhaust valve seat member 105, a chamber 106 in a control valve cover 107, and a port 108 in this cover. Simultaneously, fluid under pressure flows from the chamber 26 in the switch device 1 and the equalizing reservoir 71 to atmosphere at a restricted rate determined by the size of the choke 72 via pipe 73, pipe 70 having choke 72 therein, pipe and passageway 74, chamber 75 and thence past the unseated exhaust valve 102 to atmosphere via the pathway described above.

As explained above, fluid under pressure is now being vented from the chamber 25 in the switch device 1 at an unrestricted rate and from the chamber 26 in this switch device at a restricted rate. Accordingly, it is apparent that a pressure differential is quickly established on the opposite sides of the diaphragm 24 which pressure differential is effective to deflect this diaphragm in the direction of the left hand and thereby move the stem 28 in the same direction until the movable contact 31 secured to the left-hand end of this stem is moved into circuit-closing contact with the stationary contact 34. In this circuit-closed position of these contacts 34 and 31, the hereinbefore described circuit to the automatic brake application relay in the function selector unit 15 is supplied with electric power from the power supply wire 38 to cause energization or pickup of this relay. When this relay is thus picked up, automatic brake application command signals are transmitted from the lead to the slave locomotive via radio-transmitted signals effected by operation of the coding system 16, transmitter 17 and antenna 18. It will be understood that the brake control equipment on the slave locomotive is operative in response to receiving these signals to effect a reduction of pressure in the equalizing reservoir on this locomotive and a corresponding reduction of pressure in those portions of the train brake pipe connected thereto so long as these radio-transmitted signals are received from the lead locomotive.

Fluid under pressure is released at an unrestricted rate from the chamber 25 in the switch device 1 and the chamber 68 in the relay 45 of the automatic brake valve 10 on the lead locomotive to atmosphere via the pathway described above until the pressure in these chambers is reduced to a value corresponding to the position in its application zone to which the handle 93 of the brake valve 10 was moved by the engineer. At the same time fluid under pressure, is released at a restricted rate from the chamber 26 in the switch device 1 and the equalizing reservoir 71 to atmosphere until the pressure therein is reduced to a value corresponding to the position to which the handle 93 was moved, at which time the control valve 46 shifts to its lap position in which valve 102 is seated on seat 103 to cut off further flow of fluid under pressure to atmosphere.

It will be understood that the relay valve 45 of the automatic brake valve 10 on the lead locomotive operates in response to the release of fluid under pressure from its chamber 68 to atmosphere to release fluid under pressure from that portion of the train brake pipe connected to the lead locomotive until the pressure therein is reduced the same amount as the pressure in the chamber 68 and the equalizing reservoir 71 is reduced by operation of the control valve 46.

It will be further understood that the above-mentioned release of fluid under pressure from the chamber 26 in the switch device 1 at a restricted rate subsequent to the cessation of the release of fluid under pressure from the chamber 25 in this switch device quickly reduces the pressure in the chamber 26 to that in the chamber 25. Upon equalization of pressure in these chambers 25 and 26 in switch device 1, the corresponding springs 100 and 101 are rendered effective to shift the diaphragm 24, stem 28 and movable contact 31 to the position shown in FIG. 1 in which movable contact 31 is no longer in circuit-closing contact with the stationary contact 34. This movement of contact 31 out of circuit-closing contact with contact 34 opens the circuit to the automatic brake application relay in the function selector unit 15 thereby terminating the transmission of automatic brake application signals from the lead locomotive to the slave locomotive whereupon the brake control equipment on this locomotive operates to correspondingly terminate the reduction of pressure in that portion or those portions of the train brake pipe connected to the slave locomotive. Accordingly, form the foregoing, it will be understood that operation of the brake control valves on both locomotives and all the cars in the train occurs substantially simultaneously in response to the reduction of pressure effected in the train brake pipe to effect a brake application on the entire train.

The brakes on the entire train can be subsequently released by the engineer on the lead locomotive manually moving the handle 93 of the brake valve 10 on this locomotive out of the position it occupies in its application zone and back to its brake release position. Upon return of the handle 93 to its brake release position, the corresponding control valve 46 (FIG. 2) operates to effect the supply of fluid under pressure to the equalizing reservoir 71 and chamber 63 in relay valve 45 on the leading locomotive whereupon this relay valve operates to effect the supply of fluid under pressure from the main reservoir 5 on this locomotive to that portion of the train brake pipe connected thereto.

The control valve 46 also supplies fluid under pressure at an unrestricted rate to the chamber 25 (FIG. 1) in the switch device 1 via passageway and pipe 74, pipe and passageway 70 and passageway and pipe 67 and to the chamber 26 in this switch device 1 at a restricted rate via passageway and pipe 74, pipe 70, choke 72 and pipe 73. The more rapid supply of fluid under pressure to the chamber 25 quickly establishes a differential pressure force on the diaphragm 24 which acts in the direction of the right hand to deflect this diaphragm in the same direction to cause the stem 28 to be shifted in the direction of the right hand until the contact 32 carried thereby is moved into circuit-closing contact with the corresponding contact 37. This effects pickup of the automatic brake release relay whereupon the automatic brake valve 10 on the slave locomotive is operated in the manner hereinbefore described to effect the supply of fluid under pressure to that portion of the train brake connected thereto. Consequently, the supply of fluid under pressure to the train brake pipe is now simultaneously effected by operation of the automatic brake valve 10 on the two locomotives in the train until the train brake pipe is charged to the normal pressure carried therein, it being understood that the relay valve 45 and the switch device 1 on the lead locomotive operate in the manner hereinbefore described to terminate the supply of fluid under pressure to the train brake pipe upon the pressure therein increasing to this normal value.

Let it now be supposed that while the brakes on the entire train are released and the train is traveling along the track toward its destination it becomes necessary that the engineer on the lead locomotive effect an emergency brake application.

To effect an emergency brake application on the entire train, the engineer on the lead locomotive will move the handle 93 of the automatic brake valve 10 on this locomotive from its release position to its emergency position to effect a reduction of pressure in the brake pipe 9 and in that portion of the train brake pipe extending from the lead locomotive toward the slave locomotive at a rapid or emergency rate. The control valve 13 on the lead locomotive operates in response to this reduction of pressure in the brake pipe 10 at an emergency rate to effect a corresponding emergency brake application on this locomotive.

When the handle 93 is manually moved by the engineer to its emergency position, the emergency valve of automatic brake valve 10 is moved to a position to establish a communication via which fluid under pressure is supplied from the main reservoir 5 to the pipe 92 which is connected to the switch 3, whereupon the contact 95 of this switch is moved to its closed position in which it closes the circuit between the wires 96 and 97 to cause pickup of the hereinbefore-mentioned emergency relay in the function selector unit 15 on the lead locomotive in the manner hereinbefore described.

As hereinbefore stated, when this emergency relay is thus picked up, transmission of the emergency application command signal to the slave locomotive is made via radio-transmitted signals effected by the coding system 16, transmitter 17 and antenna 18 on the lead locomotive. It will be understood that the brake control equipment on the slave locomotive is operative in response to the emergency application command signals transmitted thereto from the lead locomotive via radio signals to effect a reduction of pressure in the brake pipe 9 on the slave locomotive and in the portions of the train brake pipe extending from each end of this slave locomotive at an emergency rate. Accordingly, it will be understood that the brake control valves on the two locomotives and all the cars in the train operate substantially simultaneously in response to a reduction of pressure in the train brake pipe at an emergency rate to effect an emergency brake application on the entire train.

When the train has been brought to a stop and all danger has past, the emergency brake application can be released by the engineer moving the handle 93 of the brake valve 10 on the lead locomotive from its emergency position back to its release position.

Let it now be supposed that, while the brakes on the entire train are released, the engineer desires to manually effect an independent brake application on the two locomotives by use of the independent brake valve 11 on the lead locomotive. To do so, he will move the handle 63 of this independent brake valve 11 from its release position into a service zone an extend corresponding to the degree of brake application desired. When the handle 63 is moved into the service zone, a cam 109 (FIG. 2) is correspondingly rotated to first effect seating of an exhaust valve 110 on its corresponding valve seat 111 and then to effect unseating of a supply valve 112 from its corresponding valve seat 113 in the usual well-known manner of operation of self-lapping valve units. Upon the unseating of supply valve 112, fluid at main reservoir pressure will flow from the main reservoir 5 to the chamber 25 (FIG. 1) in the switch device 2 via pipe and passageway 53, past open valve 112, delivery chamber 77, and passageway and pipe 76. Some of the fluid under pressure thus supplied to the pipe 76 flows therefrom to the chamber 26 at a restricted rate via the pipe 78 and choke 79 and some of the fluid under pressure thus supplied to the pipe 78 flows to the volume reservoir 80 via the choke 79 and pipe 81. Accordingly, it is apparent that the fluid under pressure supplied at an unrestricted rate to the chamber 25 and at a restricted rate to the chamber 26 and volume reservoir 80 quickly establishes a differential fluid pressure force on the diaphragm 24 of switch device 2 to deflect this diaphragm in the direction of the right hand and thereby move the stem 28 in the same direction until the movable contact 32 carried on the right-hand end of this stem is moved into circuit-closing contact with the corresponding stationary contact 37. In this circuit-closed position of these contacts 32 and 37, the independent brake application relay in the function selector unit 15 is energized or picked up to cause the transmission of the independent brake application command signal to the slave locomotive. It will be understood that the brake control equipment on the slave locomotive is operative in response to receiving these signals to effect the supply of fluid under pressure to the brake cylinder on the slave locomotive to effect an independent brake application on the slave locomotive.

Also, it will be noted from FIG. 1 of the drawings that some of the fluid under pressure supplied to the pipe 76 by the independent brake valve 11 flows therefrom to the brake cylinder 4 on the lead locomotive via pipe 82, double check valve 83 and pipe 85 to effect an independent brake application on the lead locomotive substantially simultaneously as an independent brake application is effected on the slave locomotive.

Furthermore, it will be noted from FIG. 2 of the drawings that some of the fluid under pressure supplied to the passageway 76 will flow therefrom to a chamber 114 at the left-hand side of a diaphragm 115 via a choke 116 to cause the self-lapping valve unit 50 to operate to its lap position when the pressure in the passageway and pipe 76 and in the brake cylinder 4 (FIG. 1) on the lead locomotive, and also on the slave locomotive, reaches a pressure corresponding to the position in its application zone to which the handle 63 of independent brake valve 11 was moved by the engineer.

Subsequent to movement of the self-lapping valve unit 50 to its lap position, fluid under pressure will flow from the pipe 76 to the chamber 26 in the switch device 2 and to the volume reservoir 80 via the choke 79 and pipes 78 and 81 until the pressures in the chamber 25 and 26 and the volume reservoir 80 substantially equalize whereupon the corresponding springs 100 and 101 are rendered effective to shift the diaphragm 24, stem 28 and contact 32 of switch device 2 to the position shown in FIG. 1 to effect deenergization of the independent brake application relay in the function selector unit 15 thereby terminating the transmission of independent brake application command signals from the lead to the slave locomotive. It will be understood that the brake control equipment on the slave locomotive is operative upon cessation of the independent brake application command signals to prevent further supply of fluid under pressure to the corresponding brake cylinder.

To release the above-described independent brake application on the two locomotives in the train, the engineer will return the handle 63 of the independent brake valve 11 on the lead locomotive to its release position. As the handle 63 is thus returned to its release position, the self-lapping valve unit 50 of the brake valve 11 will operate in the usual way to completely release fluid under pressure from the passageway and pipe 76, brake cylinder 4, and chamber 25 in the switch device 2 to atmosphere at an unrestricted rate. At the same time fluid under pressure will be released from the chamber 26 in the switch device 2 and the volume reservoir 80 at a restricted rate via pipes 81 and 78, choke 79, pipe and passageway 76 and the self-lapping valve unit 50.

It is apparent from the foregoing that a pressure differential is quickly established on the opposite sides of the diaphragm 24 which pressure differential is effective to deflect this diaphragm in the direction of the left hand and thereby shift stem 28 in this same direction to move contact 31 into circuit-closing contact with contact 34. In this circuit-closed position of these contacts 34 and 31 of switch device 2, the hereinbefore-described circuit to the independent quick-release relay in the function selector unit 15 is supplied with electric power from the power supply wire 38 to cause pickup of this relay. In the manner aforesaid, pickup of this relay effects transmission of the independent brake release command signal to the slave locomotive. It will be understood that the brake control equipment on the slave locomotive is operative in response to receiving these signals to completely release all fluid under pressure from the corresponding brake cylinder on the slave locomotive substantially simultaneously as fluid under pressure is completely released from the brake cylinder 4 on the lead locomotive. Thus, an independent release of the brakes on the two locomotives in the train is effected.

Subsequent to the complete unrestricted release of fluid under pressure from the chamber 25 in the switch device 2 to atmosphere via the pathway described above, fluid under pressure will continue to flow at a restricted rate from the chamber 26 in this switch device 2 and the volume reservoir 80 to atmosphere via pipes 81 and 78, choke 79, pipe and passageway 76 and the self-lapping valve 50 of the brake valve 11 until all fluid under pressure is substantially released from chamber 26 and volume reservoir 81 whereupon the corresponding springs 110 and 101 are rendered effective to shift the diaphragm 24, stem 28 and movable contacts 31, 32 to the position shown in FIG. 1 in which movable contact 31 is no longer in circuit-closing contact with the stationary contact 34. Thus, the circuit to the independent quick-release relay in the function selector unit 15 is opened to terminate the transmission of the independent brake release command signal to the slave locomotive.

Let it be supposed that a partial or full service brake application has been effected on the two locomotives and all the cars in the train by manual operation of the automatic brake valve device 10 on the lead locomotive, in the manner hereinbefore described.

Also, let it be supposed that subsequent to effecting a partial or full service brake application on the two locomotives and all the cars in the train, the engineer desires to effect a release of the brakes only on the two locomotives, without effecting a release of the brakes on the cars in the train.

To effect a release of the brakes on the two locomotives without effecting a release of the brakes on the cars in the train, the engineer will depress the handle 63 (FIGS. 1 and 2) of the independent brake valve device 11 on the lead locomotive so that it is rocked clockwise about the pin 64 (FIG. 2). As the handle 63 is depressed, the roller 65 carried thereby is effective, through intermediary of the pusher stem 66, to move the release valve 51 downward from the position shown in FIG. 2 to a position in which the peripheral annular groove 57 on the release valve 51 closes communication between the actuating pipe and passageway 55 and the atmospheric vent port 56, and establishes a communication between the actuating pipe and passageway 55 and the passageway and pipe 53 which is connected to main reservoir 5. Therefore, when the release valve 51 is thus moved to its lower position by the engineer manually depressing the handle 63 of the independent brake valve 11, fluid under pressure will flow from the main reservoir 5 to the release selector valve portion of the quick-release valve of the brake control valve 13 on the lead locomotive via pipe and passageway 53, groove 57 on independent release valve 51, and passageway and pipe 55 to effect a release of the brakes only on the lead locomotive.

As can be seen from FIG. 1, some of the fluid under pressure supplied to the pipe 55 in the manner described above flows therefrom to the fluid-pressure-operated switch 59 via the pipe 58 to move the contact 60 of this switch to its closed position to establish the circuit between the wires 61 and 62. When this circuit is thus established, the independent quick-release relay in the function selector unit 15 is energized or picked up to effect transmission of the independent brake release command signal to the slave locomotive or locomotives in the manner hereinbefore described to cause a release of the brakes only on this slave locomotive substantially simultaneously as the brakes are released on the lead locomotive.

Figure 3:
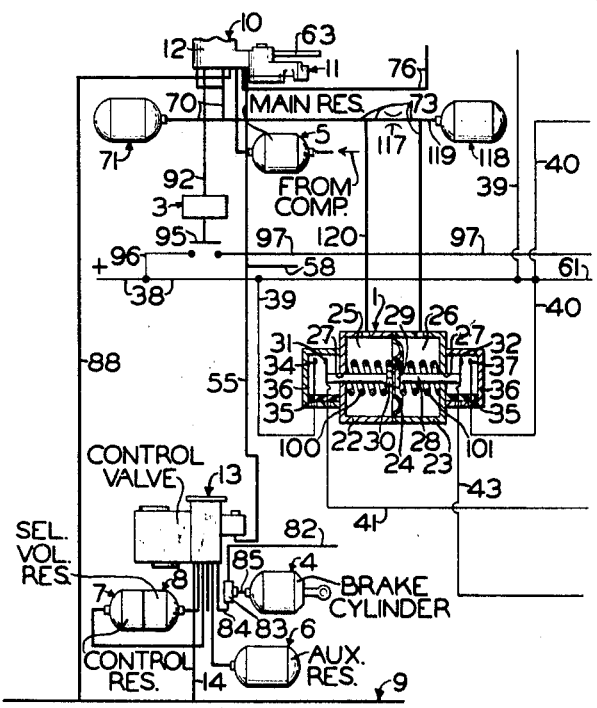
FIG. 3 is a partial diagrammatic view of a locomotive brake control equipment constructed in accordance with a second embodiment of the invention when this locomotive is used as the lead locomotive in RMU operation it being understood that the remainder of the equipment (not shown) is the same as that shown in FIG. 1.

Referring to FIG. 3 of the drawings, a modified arrangement of a brake control equipment for a locomotive when it is used as the lead locomotive in remote multiple unit operation is shown which differs from the first embodiment of the invention shown in FIG. 1 by the elimination of the choke 72 from the pipe 70 (FIGS. 1 and 2) and the interposition of a choke 117 (FIG. 3) in the pipe 73 and the addition of a supplemental volume reservoir 118 which is connected to the pipe 73 on the right-hand or downstream side of the choke 117 by a short pipe 119. This second embodiment of the invention further differs from the first embodiment shown in FIG. 1 in that the chamber 25 in the switch device 1 is connected to the pipe 73 on the left-hand or upstream side of the choke 117 by a pipe 20. The purpose of elimination of the choke 72 and the addition of the choke 117 is to, respectively, assure an unrestricted rate of supply of fluid under pressure to and the release of fluid under pressure from the equalizing reservoir 71 and chamber 25 in switch device 1, and a restricted rate of supply of fluid under pressure to and the release of fluid under pressure from the chamber 26 in this switch device so that this switch device 1 shown in FIG. 3 functions the same as the switch device 1 shown in FIG. 1. Accordingly, like reference numerals have been used to designate the structure shown in FIG. 3 which is identical with that shown in FIG. 1 and already described.

The operation of the locomotive brake control equipment shown in FIG. 3 is substantially the same as that of the locomotive brake control equipment shown in FIG. 1. Hence, a detailed description of the operation of the brake control equipment shown in FIG. 3 is not deemed necessary.

Having now described the invention, what I claim as new and desire to secure by Letters Patent, is:

I claim:

1. In a multiple locomotive brake control system for a train of cars having a lead locomotive and at least one slave locomotive remotely located therefrom, brake control apparatus for the lead locomotive comprising the combination of:
   a. a normally charged brake pipe variations of the fluid pressure in which are effective to control brake applications and brake releases on the locomotives and cars in the train,
   b. a normally charged equalizing reservoir,
   c. a brake valve having:
      i. a relay valve which is subject to the opposing pressures in said equalizing reservoir and said brake pipe and is operative by the differential of such pressures to control the pressure in said brake pipe, and
      ii. regulating valve means operative to control the pressure in said equalizing reservoir, and
   d. coding and radio signal transmitting means for transmitting command signals from the lead locomotive to a slave locomotive, wherein the improvement comprises:
   e. means controlled according to the operation of the brake valve for correspondingly controlling operation of the coding and radio signal transmitting means.

2. In a multiple locomotive brake control system for a train of cars, the combination as claimed in claim 1, further characterized in that the last said means comprises a fluid-pressure-operated switch device operated accordingly as said brake valve is selectively manually operated to corresponding ones of a plurality of operating positions.

3. In a multiple locomotive brake control system for a train of cars, the combination as claimed in claim 2, further characterized in that said switch device comprises:
   a. an abutment subjected to fluid pressure on opposite sides thereof and movable in opposite directions from a neutral position respectively according to the predominating pressure acting thereon, and
   b. a pair of normally open switches disposed on opposite sides respectively of the abutment and operative selectively to closed positions upon movement of said abutment out of its neutral position in the direction of the switch, and in that
   c. said regulating valve means is effective upon operation thereof to supply fluid under pressure to or release fluid under pressure from both sides of said abutment simultaneously, and
   d. said system including choke means restricting the supply and release of fluid under pressure to and from the chamber at one side of said abutment.

4. In a multiple locomotive brake control system for a train of cars, the combination as claimed in claim 3, further characterized in that said switch device comprises biasing means operable upon substantial equalization of pressure on opposite sides of its abutment to move said abutment to its neutral position in which the said switches are restored to normally open position.

5. In a multiple locomotive brake control system for a train of cars, the combination as claimed in claim 3, further characterized by volume means communicating with the chamber on the said one side of said abutment.

6. In a multiple locomotive fluid pressure brake control system for controlling braking of a train of cars having a lead locomotive and at least one slave locomotive remotely located therefrom, brake control apparatus for the lead locomotive comprising the combination of:
   a. a normally charged brake pipe, variations of the fluid pressure in which are effective to control brake applications and brake releases on the locomotives and cars in the train;
   b. a normally charged equalizing reservoir;
   c. an automatic brake valve having:
      i. a relay valve which is subject to the opposing pressures in said equalizing reservoir and said brake pipe and is operative by the differential of such pressures to control the pressure in said brake pipe, and
      ii. regulating valve means operative to control the pressure in said equalizing reservoir;
   d. a brake-applying means;

e. control valve means for supplying fluid under pressure to and releasing fluid under pressure from the brake-applying means responsively to variations of pressure in the brake pipe;
f. an independent brake valve having:
   i. a self-lapping valve means, operable to supply fluid under pressure to and release fluid under pressure from the brake-applying means, and
   ii. manually operable means for effecting operation of said self-lapping valve means to supply fluid at different pressures to said brake-applying means;
g. coding and radio signal transmitting means for transmitting command signals from the lead locomotive to a slave locomotive, wherein the improvement comprises:
h. first means controlled according to the operation of said automatic brake valve for correspondingly controlling operation of the coding and radio signal transmitting means; and
i. second means controlled according to the operation of said independent brake valve for also corresponding controlling operation of the coding and radio signal transmitting means.

7. In a multiple locomotive brake control system for a train of cars, the combination as claimed in claim 6, further characterized in that each of said means comprises:
   a. an abutment subjected to fluid pressure on opposite sides thereof and movable in opposite directions from a neutral position respectively according to the predominating pressure acting thereon, and
   b. a pair of normally open switches disposed on opposite sides respectively of the abutment and operated selectively to closed positions upon movement of said abutment out of its neutral position in the direction of the switch, and in that
   c. said regulating valve means is effective upon operation thereof to supply fluid under pressure to or release fluid under pressure from both sides of the abutment of said first means simultaneously, and said self-lapping valve means is effective upon operation thereof to supply fluid under pressure to or release fluid under pressure from both sides of the abutment of said second means simultaneously, and
   d. said system further including first choke means restricting the supply and release of fluid under pressure to and from the chamber at one side of said abutment of said first means, and
   e. second choke means restricting the supply and release of fluid under pressure to and from the chamber at one side of said abutment of said second means.

8. In a multiple locomotive brake control system, the combination as claimed in claim 7, further characterized in that the chamber at said one side of the abutment of said first means communicates directly with said equalizing reservoir and the chamber on the other side of said abutment communicates with said equalizing reservoir via said first choke means.

9. In a multiple locomotive brake control system for a train of cars, the combination as claimed in claim 7, further characterized by volume means communicating directly with the chamber at the said one side of said abutment of said second means for increasing the volume of this chamber above the volume of the chamber on the other side of said abutment.

10. In a multiple locomotive brake control system for a train of cars, the combination as claimed in claim 7, further characterized in that said equalizing reservoir is directly connected to the chamber at the said one side of the abutment of said first means, and a volume reservoir is directly connected to the chamber at the said one side of the abutment of said second means.

11. In a multiple locomotive brake control system for a train of cars, the combination as claimed in claim 7, further characterized in that the choke means for said first means is interposed between the chambers at opposite sides of the abutment of the first means, a volume reservoir is connected to the chamber at the said one side of said abutment of the first means, and said equalizing reservoir is connected directly to the chamber at the other side of said abutment of the first means.

12. In a multiple locomotive brake control system for a train of cars, the combination as claimed in claim 3, further characterized in that one switch of said pair of switches, while closed, causes operation of said coding and radio signal transmitting means to transmit a brake application command signal to a slave locomotive, and in that the other switch of said pair of switches, while closed, causes operation of said coding and radio signal transmitting means to transmit a brake release command signal to a slave locomotive.

13. In a multiple locomotive brake control system for a train of cars, the combination as claimed in claim 7, further characterized in that:
   a. one switch of said pair of switches of said first means, while closed, establishes a circuit to cause operation of said coding and radio transmitting means to transmit an automatic brake application command signal to a slave locomotive,
   b. the other switch of said pair of switches of said first means, while closed, establishes a circuit to cause operation of said coding and radio transmitting means to transmit an automatic brake release command signal to a slave locomotive,
   c. one switch of said pair of switches of said second means, while closed, establishes a circuit to cause operation of said coding and radio transmitting means to transmit an independent brake release command signal to a slave locomotive, and
   d. the other switch of said pair of switches of said second means, while closed, establishes a circuit to cause operation of said coding and radio transmitting means to transmit on an independent brake application signal to a slave locomotive.